United States Patent
White et al.

(10) Patent No.: US 10,197,360 B2
(45) Date of Patent: Feb. 5, 2019

(54) OPTICAL DEVICE KNOB HAVING VARIABLE RESISTANCE ROTATION

(71) Applicant: Burris Company, Inc., Greeley, CO (US)

(72) Inventors: Matthew Travis White, Fort Collins, CO (US); Steven A. Bennetts, Eaton, CO (US); Seth Alan Feinberg, Greeley, CO (US)

(73) Assignee: BURRIS COMPANY, INC., Greeley, CO (US)

( * ) Notice: Subject to any disclaimer, the term of this patent is extended or adjusted under 35 U.S.C. 154(b) by 22 days.

(21) Appl. No.: 15/342,035

(22) Filed: Nov. 2, 2016

(65) Prior Publication Data
US 2018/0120059 A1 May 3, 2018

(51) Int. Cl.
F41G 1/38 (2006.01)
G02B 23/16 (2006.01)
F41G 1/44 (2006.01)

(52) U.S. Cl.
CPC ............... *F41G 1/38* (2013.01); *F41G 1/44* (2013.01); *G02B 23/16* (2013.01)

(58) Field of Classification Search
CPC .......................................................... F41G 1/38
USPC ...................................... 33/1 N; 42/111, 119
See application file for complete search history.

(56) References Cited

U.S. PATENT DOCUMENTS

| 5,941,006 | A | 8/1999 | Horton | |
|---|---|---|---|---|
| 7,703,679 | B1 | 4/2010 | Bennetts et al. | |
| 8,240,075 | B1 | 8/2012 | Mullin | |
| 8,584,394 | B1 | 11/2013 | Thomas | |
| 9,423,215 | B2 * | 8/2016 | White | F41G 3/08 |
| 9,435,609 | B2 | 9/2016 | Hamilton | |
| 2013/0276345 | A1 * | 10/2013 | Hamilton | F41G 1/38 42/119 |
| 2013/0312310 | A1 * | 11/2013 | Geller | F41G 1/38 42/122 |
| 2014/0000146 | A1 * | 1/2014 | Davidson | F41G 1/38 42/122 |
| 2015/0316350 | A1 * | 11/2015 | Hamilton | F41G 1/38 42/122 |
| 2016/0146576 | A1 * | 5/2016 | White | F41G 1/38 42/119 |
| 2016/0370146 | A1 * | 12/2016 | Hamilton | F41G 1/38 |
| 2017/0010068 | A1 * | 1/2017 | White | F41G 1/38 |
| 2018/0023922 | A1 * | 1/2018 | Walker | F41G 1/38 |

* cited by examiner

*Primary Examiner* — G. Bradley Bennett

(57) ABSTRACT

An optical device housing has a post rotatably extending therefrom and a sleeve fixedly extending therefrom. The sleeve is disposed about the post and a knob is connected to the post. A nut rotatably engages with the sleeve and is configured to rotate with the knob. An adjustment screw is threadably engaged with the nut and engages with the knob so as to rotate with the knob. Rotation of the adjustment screw about a screw axis increases a frictional resistance between the nut and the sleeve.

20 Claims, 8 Drawing Sheets

OPTICAL DEVICE KNOB HAVING VARIABLE RESISTANCE ROTATION

INTRODUCTION

Aiming a rifle or gun requires the consideration of several environmental and other types of factors. When a bullet travels from a rifle to an intended target, several forces affect the flight of the bullet. Gravity causes the bullet to drop in elevation as the bullet travels from the firearm to the target. If a hunter 100 is close to his/her target 102, as shown in FIG. 1A, the bullet drops very little, represented by the trajectory 104. At greater distances, gravity causes a bullet to drop in elevation more significantly, as represented by the trajectory 106 in FIG. 1B. An optical device such as a riflescope is used to accurately aim the rifle.

SUMMARY

In one aspect, the technology relates to an apparatus having: an optical device housing; a post rotatably extending from the optical device housing; a sleeve fixedly extending from the optical device housing and disposed about the post; a knob connected to the post so as to be rotatable relative to the optical device housing; a nut rotatably engaged with the sleeve and configured to rotate with the knob; and an adjustment screw having a screw axis, wherein the adjustment screw is threadably engaged with the nut and engaged with the knob so as to rotate with the knob, wherein a rotation of the adjustment screw about the screw axis increases a frictional resistance between the nut and the sleeve. In an example, the post includes a post axis and wherein each of the post, the sleeve, the knob, and the nut are centered about the post axis, and wherein the post axis is substantially parallel to the adjustment axis. In another example, the nut defines an opening for threadably receiving the adjustment screw. In yet another example, the rotation of the adjustment screw about the screw axis moves the adjustment screw along the adjustment screw axis and within the opening. In still another example, the nut includes a split nut.

In another example of the above aspect, the split nut includes a first portion and a second portion, wherein each of the first portion and the second portion are threadably engaged with the sleeve, and wherein the first portion defines the opening. In an example, the rotation of the adjustment screw about the screw axis moves the adjustment screw along the adjustment screw axis and into contact with the second portion. In another example, the nut is threadably engaged with the sleeve.

In another aspect, the technology relates to an apparatus having: an optical device housing; a post rotatably extending from the optical device housing; a sleeve fixedly extending from the optical device housing and disposed about the post, wherein the post and sleeve are centered on a common axis; a knob connected to the post so as to be rotatable relative to the optical device housing; a nut engaged with the sleeve and configured to rotate with the knob; and an adjustment screw having a screw axis substantially parallel to the common axis, wherein the adjustment screw is configured to engage the nut along the screw axis, wherein a rotation in a first direction of the adjustment screw about the screw axis applies a force to the nut so as to increase a frictional resistance between mating threads on the nut and the sleeve. In an example, each of the nut and the sleeve having mating threads and wherein a rotation in a second direction of the position adjustment element decreases the frictional resistance between the mating threads on the nut and the sleeve.

In another example, the rotation in the second direction entirely disengages the adjustment screw from at least a portion of the nut. In yet another example, the adjustment screw is threadably engaged with and received in the nut. In still another example, the nut is disposed around the sleeve.

In another example of the above aspect, the nut is a split nut. In an example, the adjustment screw is actuated from a top portion of the knob. In another example, the adjustment screw is actuated by manually rotating a gear.

In another aspect, the technology relates to an apparatus having: an optical device housing; a post rotatable about an axis extending from the optical device housing; a sleeve fixedly extending from the optical device housing and disposed about the post, wherein the post and sleeve are centered on an axis; a knob connected to the post so as to be rotatable relative to the optical device housing; a split nut rotatably engaged with the sleeve, the split nut having a first portion and a second portion; and an adjustment screw engaged with the split nut, wherein a rotation of the adjustment screw moves the split nut in at least one direction parallel to the axis, while not rotating the split nut. In an example, in a first adjustment screw position, the adjustment screw is threadably received in the first portion and disengaged from the second portion. In another example, in a second adjustment screw position, the adjustment screw is threadably received in the first portion and is engaged with the second portion so as to generate a first frictional resistance between mating threads of the split nut and the sleeve. In yet another example, in a third adjustment screw position, the adjustment screw is threadably received in the first portion and is engaged with the second portion so as to generate a second frictional resistance between mating threads of the split nut and the sleeve, wherein the second frictional resistance is greater than the first frictional resistance.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

The present technology relates to new and improved embodiments of known sighting systems and methods (such as those described in U.S. Pat. No. 7,703,679, the disclosure of which is hereby incorporated by reference herein in its entirety), for correctly aiming a firearm or other implement. As used herein, a "sighting system" shall be construed broadly and is defined as one or more optical devices and processing systems that assist a person in aiming a projectile launch system, such as a firearm, a rifle, a handgun, or other implement. The disclosed technology has application in any type of sighting system or optical device, including those with addressable aiming elements and those without. In this application, a riflescope will be described as an exemplary embodiment.

Figure 1A:
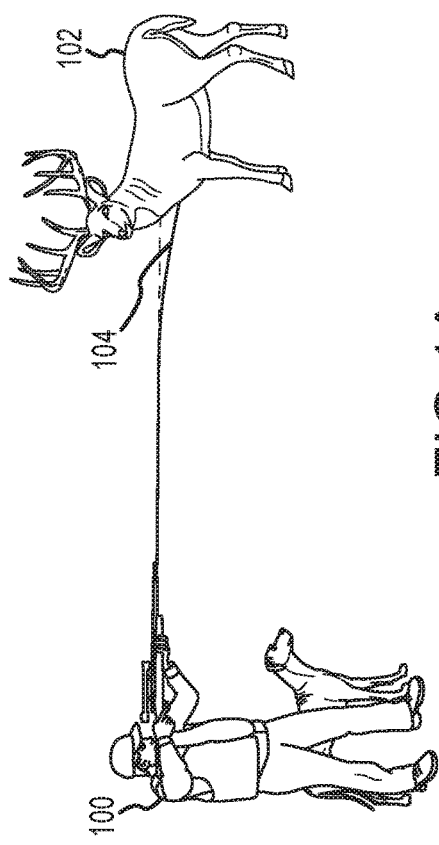
FIGS. 1A-1B depict simplified representations of the effect of gravity on the flight of a bullet.
Figure 1B:
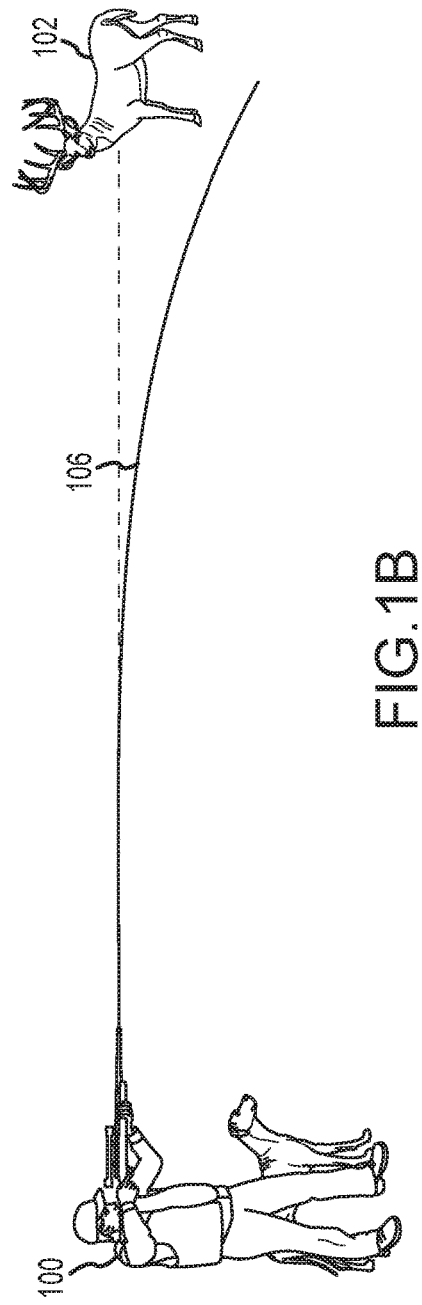
Figure 2A:
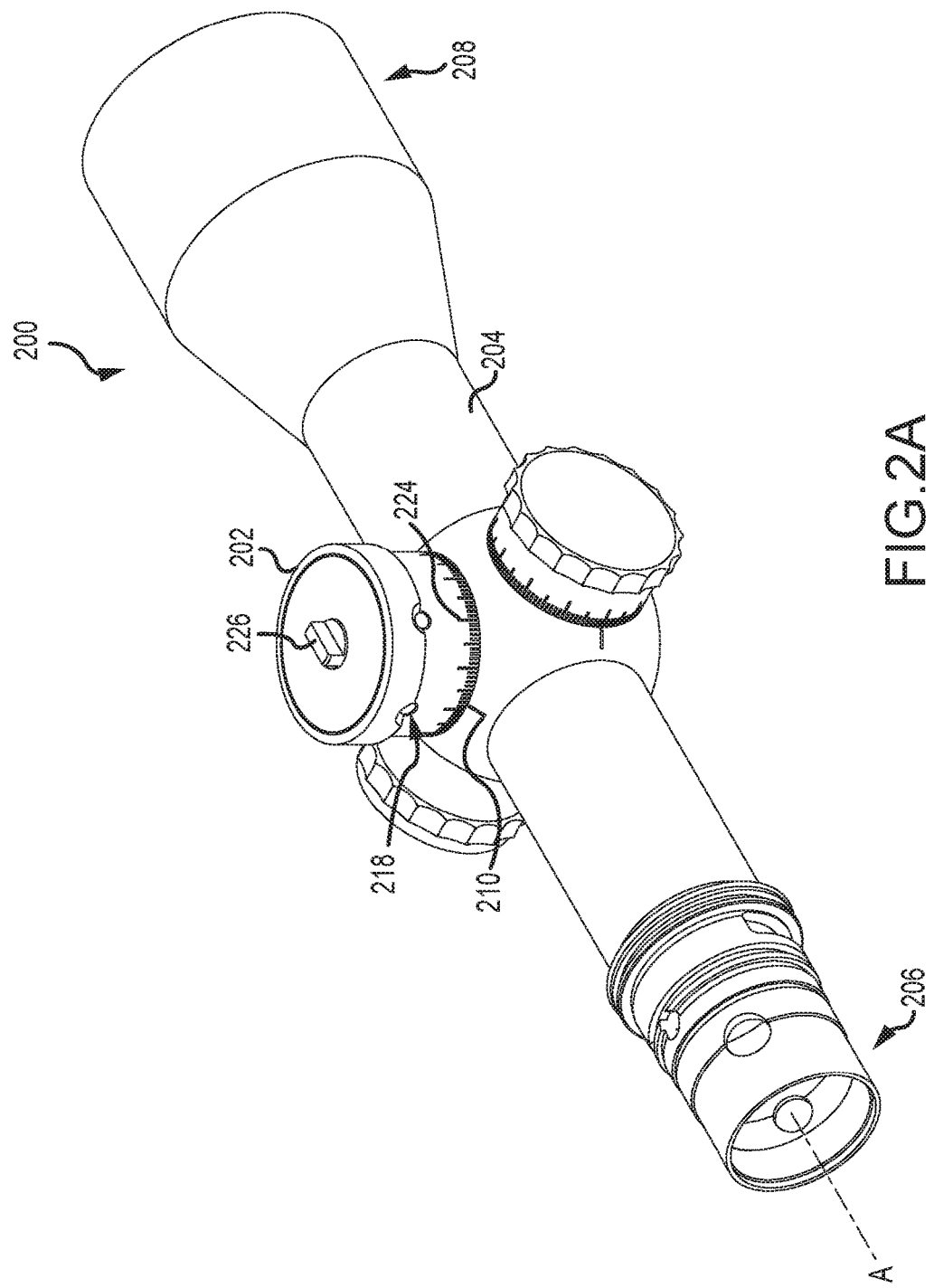
FIG. 2A depicts a partial perspective view of an optical device.
Figure 2B:
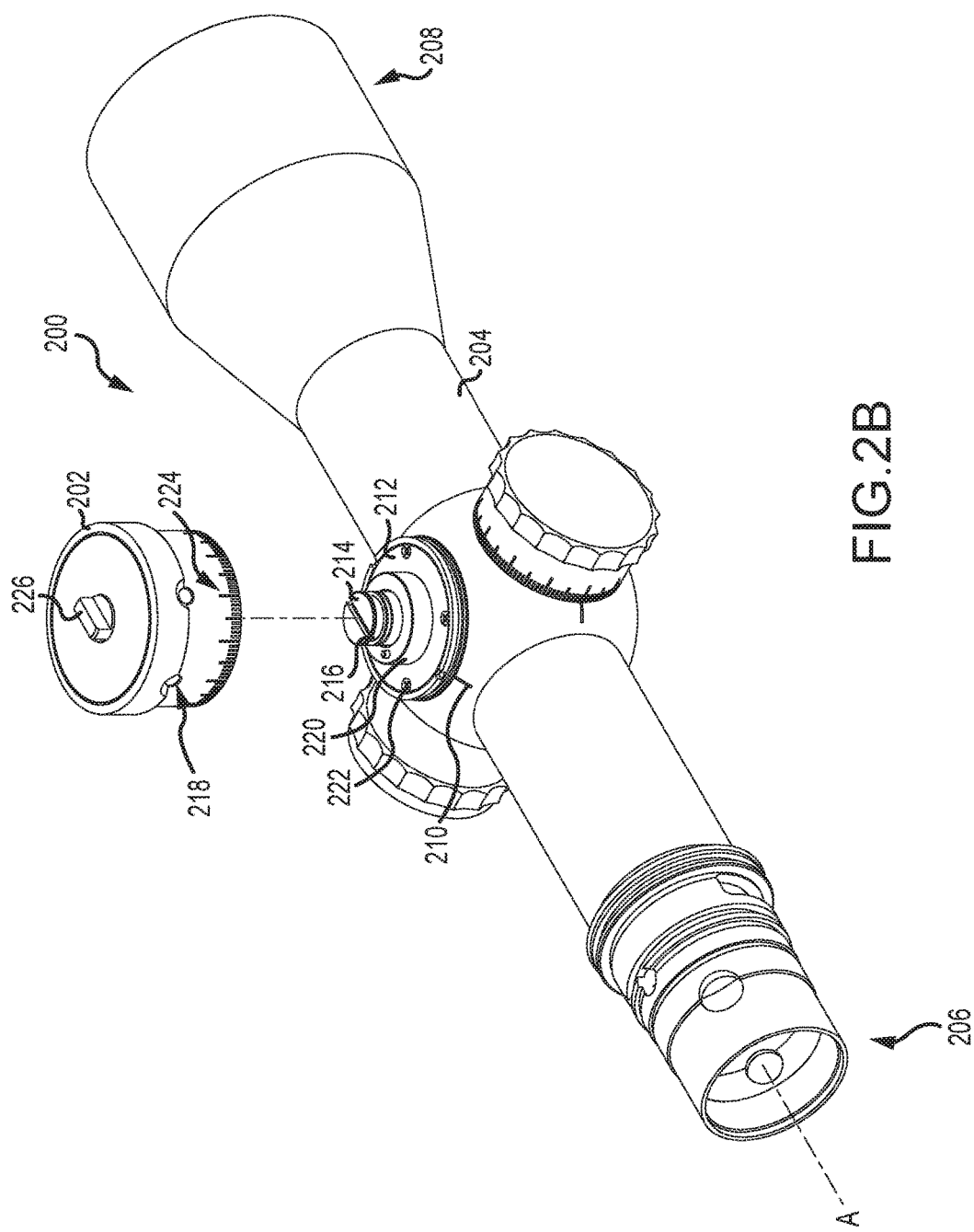
FIG. 2B depicts a partial exploded perspective view of an optical device.

A hunter, sniper, or other person using a rifle or other firearm, commonly referred to as a shooter, uses optical sighting systems, such as riflescopes, to visually acquire a target and improve aiming accuracy. FIGS. 2A and 2B depict partial perspective and partial exploded perspective views of an optical device 200 in the form of a riflescope. These two figures are described concurrently. The optical device 200 utilizes an adjustment knob 202 that is used to adjust one or more settings of the optical device. The optical device 200 includes a housing 204 having a longitudinal axis A, as well as an ocular end 206 and an objective end 208 (an ocular bell housing and lenses are not depicted in FIGS. 2A and 2B). A reference mark 210 is disposed on a surface of the housing 204, proximate a knob mount 212. The knob mount 212 is secured to the housing 204 and defines a location upon which the knob 202 rests when attached to an adjustment post 214. The adjustment post 214 includes a neck 216 sized so as to receive a plurality of set screws (not shown) disposed in openings 218 defined by the knob 202. The adjustment post 214 is rotatably mounted relative to the housing 204. Once the knob 202 is secured to the adjustment post 214, rotation of the knob 202 rotates the adjustment post 214, so as to adjust a sighting system disposed in the housing 204 (e.g., moving lenses or reticles, or changing other optical settings of the sighting system, as known in the art).

The knob mount 212 may include a sleeve 220 that is fixedly secured relative to the housing 204 (e.g., via the knob mount 212), so as not to rotate relative thereto. A clocking pin 222 extends from the sleeve 220 and is fixed so as not to move upon rotation of the knob 202. The clocking pin 222 prevents overrotation of the knob 202. The knob 202 includes a plurality of reference markings 224, typically in the form of tick marks or lines disposed about an outer circumference of the knob 202. Rotation of the knob 202 aligns different reference markings 224 with the reference mark 210 on the housing 204, thus providing a visual indication to the shooter of a setting of the optical device 200. Once a desired position of the knob 202 (relative to the housing 204) is set, it may be desirable for the shooter to set this position of the knob 202, so as to avoid inadvertent rotation thereof. Such an inadvertent rotation, if unnoticed, may change a setting of the optical device 200, potentially causing an inaccurate later shot by the associated rifle.

Accordingly, the optical devices described herein utilize knobs that are configured to variably resist rotation by utilizing structure that selectively increases and decreases the frictional resistance of the knob. This can reduce or prevent the likelihood of rotation of the knob. Additionally, the frictional resistance may be varied so the knobs may be turned easily or with difficulty, as required or desired by a particular shooter. For example, when zeroing the knob (e.g., after a successful shot), a shooter may want little to no additional resistance applied to the knob so as to enable a faster rotation. When precise rotation of the knob is required, the shooter may set the frictional resistance of the knob to a desired setting, so as to prevent, e.g., inadvertent overrotation thereof. When a desired position is attained, the frictional resistance may be further increased so as to set the knob against inadvertent rotation in the desired position. The variable friction knobs described herein, however, need not wholly prevent rotation once set. So-called "locking knobs" available in the prior art often include elements that physically engage in such a way that a high force applied to the knob can break the locking mechanism, causing damage to the knob that requires repair or replacement. The variable friction knobs described herein, however, resist rotation applied up to a certain force. Higher forces, however, will cause rotation of the knob, without damage to the mechanism that resists rotation. As such, the variable friction knobs are more versatile and less prone to damage than many prior art locking knobs.

Relative to FIGS. 2A and 2B, then, the optical device includes a friction adjustment element 226, here in the form of a rotatable arm that extends from the knob 202. The knob 202 may be rotated independently of the friction adjustment element 226 (e.g., rotation of the knob 202 rotates, but does not actuate, the friction adjustment element 226). The friction adjustment element 226 rotates with rotation of the knob 202, but may also, upon actuation, rotate relative to both the knob 202 and the housing 204. Such a rotation of the adjustment element 226 adjusts the frictional resistance of the knob 202 but does not rotate the knob 202 itself. Additionally, when a desired position of the knob 202 is attained, the adjustment element 226 may be rotated to set a friction level sufficient to maintain that position, without rotation of the knob 202 itself. In FIGS. 2A and 2B, only a single knob 202 of multiple knobs on the optical device 200 is depicted as including a friction adjustment element 226. Any number of knobs on a given optical device may incorporate the technologies described herein.

Figure 3A:
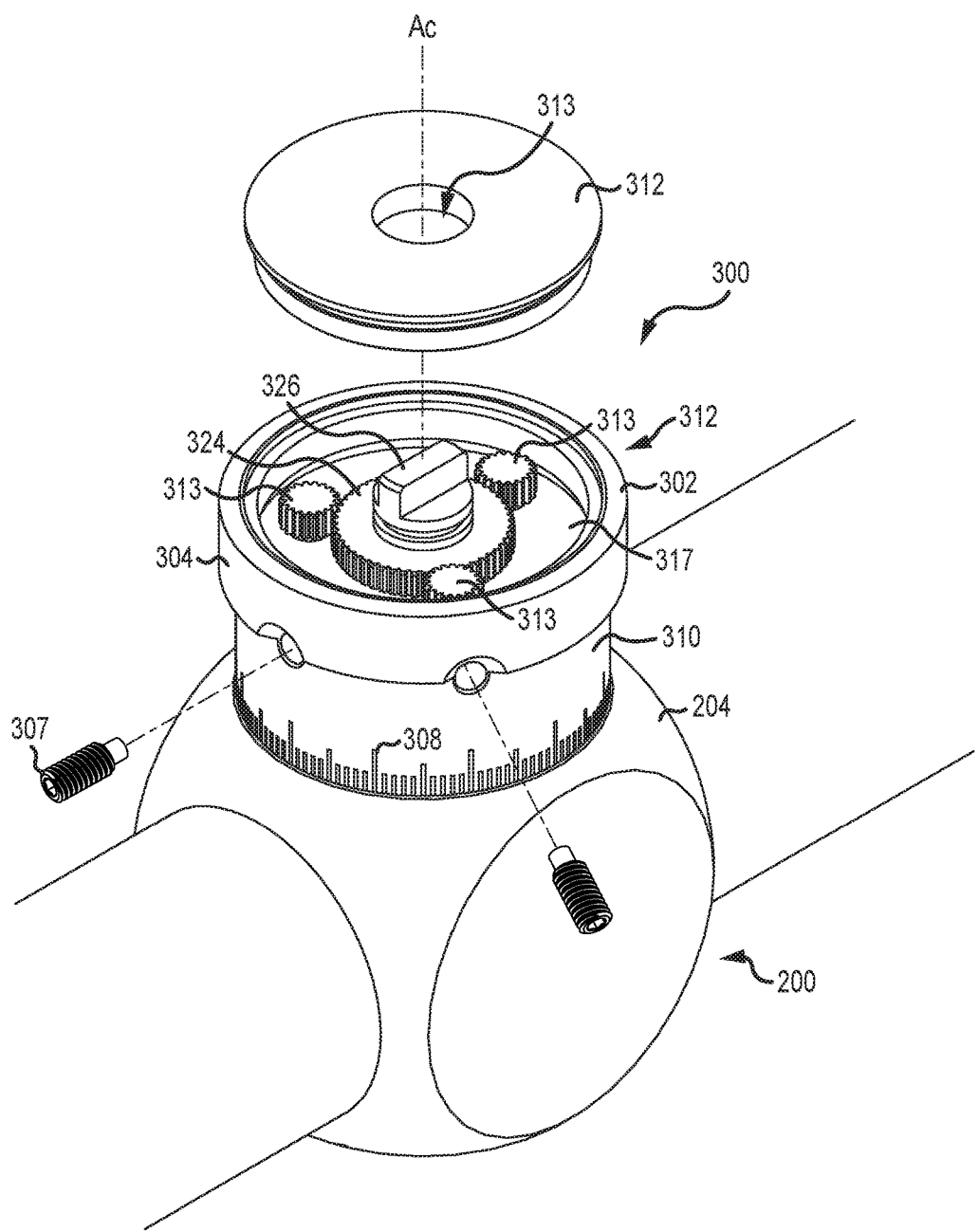
FIGS. 3A-3B depict a partial exploded perspective view and an exploded perspective view, respectively, of a variable friction knob for an optical device.
Figure 3B:
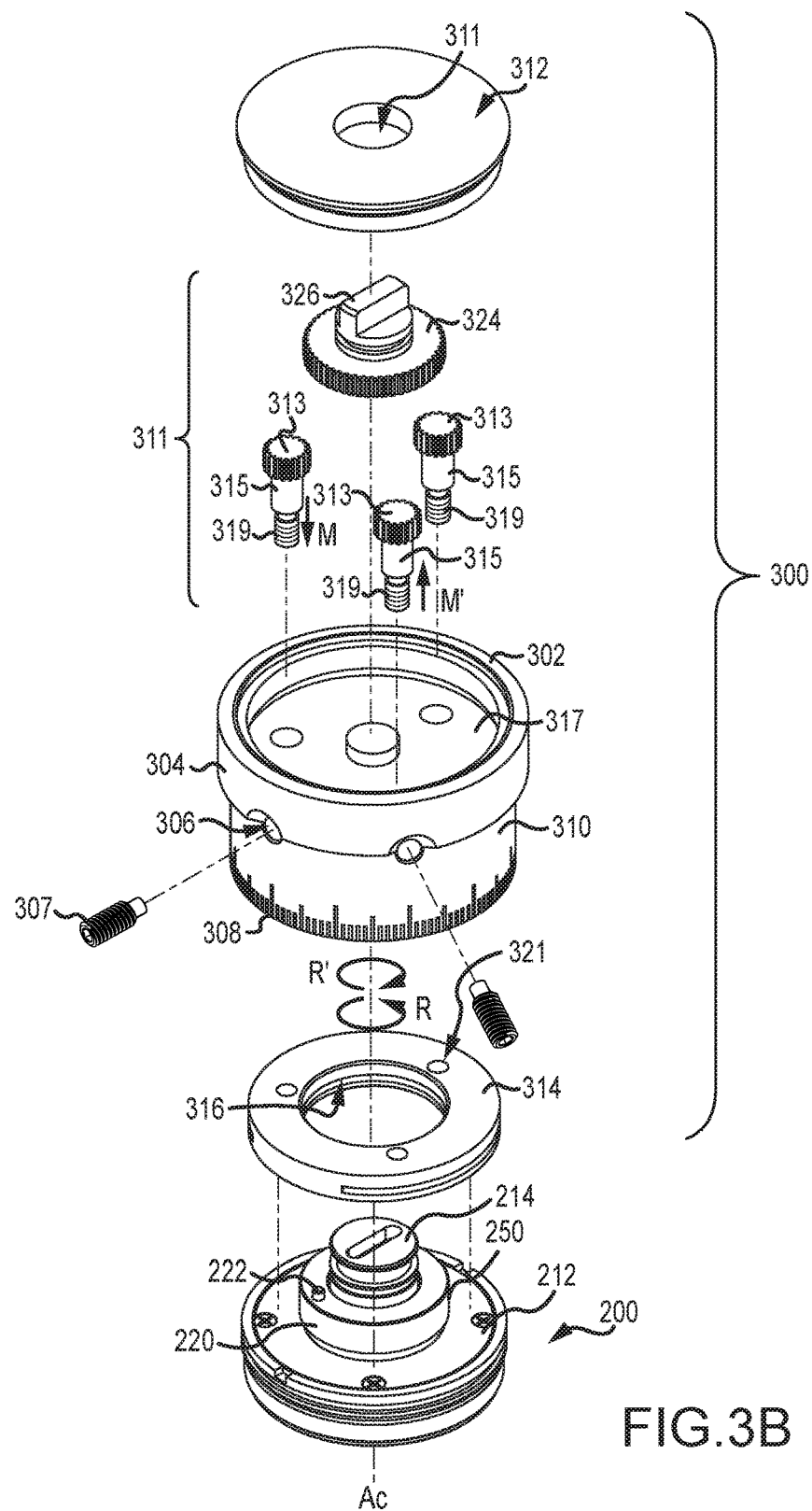

FIGS. 3A-3B depict a partial exploded perspective view and an exploded perspective view, respectively, of a variable friction knob 300 for an optical device 200. FIGS. 3A and 3B are described generally concurrently. Also depicted, for context, is a portion of an optical device 200, notably, a housing 204, a fixed knob mount 212, and components extending therefrom. More specifically, a sleeve 220 and a clocking pin 222 fixedly extend from the knob mount 212. A post 214 rotatably extends from the sleeve 220. A common central axis $A_C$, about which components of the knob 300 are centered, is defined by the post 214.

The variable friction knob 300 includes a knob housing 302 that has a gripping portion 304, which may be knurled or otherwise textured to provide a secure gripping surface. As described above, the knob 302 also defines a plurality of openings 306 for receiving set screws 307. Reference markings 308 are also depicted on the exterior surface 310 of the housing 302. The reference markings 308 may additionally include alphanumeric indicia or other symbols. In another example, the knob 300 may incorporate the multi-turn knob technologies described in U.S. Pat. No. 9,423,215, the disclosure of which is hereby incorporated by reference herein in its entirety. A top plate 312 of the knob housing 302 seals the knob 300 against intrusion of dirt, debris, rainwater, or other containments that may be found in the field. The adjustment element 326 extends through an opening 311 defined by the top plate 312.

The variable friction knob 300 also includes a gear mechanism 311 that may be utilized to vary the amount of frictional resistance to rotation of the knob housing 302, certain benefits and advantages of which are described above. The gear mechanism 311 includes the adjustment element 326, rotation of which turns a sun gear 324, which in turn rotates one or more planetary gears 313. The planetary gears 313 drive adjustment screws 315 that penetrate a support plate 317 and are at least partially threadably engaged with a friction element 314, in the case a split ring or nut. The friction element 314 is substantially ring-shaped and has an inner surface 316 that is closely engaged with a corresponding outer surface 250 on an exterior of the sleeve 220. Thus, rotation of the housing 302 causes corresponding rotation of the screws 315 about the axis $A_C$, which is in turn rotates the friction element 314 about axis $A_C$. In another example, the inner surface 316 and the outer surface 250 may be threadably engaged with a so-called "slow thread." Such threaded mating surfaces 316, 250 allow the friction element 314 to rotate about the sleeve 220 and move substantially parallel to the axis $A_C$, without causing binding between threads 319 on the screw 315 and threads 321 on the friction element 314. These threads 319, 321 utilize a "faster" thread. Rotation of the adjustment element 326 rotates the sun gear 324, which in turn, rotates the planetary gears 313. Due to the threaded engagement 319, 321 between the screws 315 and the friction element 314, rotation of the adjustment element 326 will drive the screws 315 downward. As such, a first directional rotation R of the adjustment element 324 produces a first linear movement M of the screws 315, while a second opposite directional rotation R' produces a second linear movement M' of the screws 315. These rotations R, R' and corresponding movements M, M' adjust the frictional resistance of the knob 300, as described in more detail below. To rotate R, R' the sun gear 324, a shooter applies a force to the adjustment element 326 that projects through the opening 311, which enables easy access and rotation R, R'.

The position of the friction element 314, relative to the sleeve 220, as described in further detail below, determines the frictional resistance of the knob 300 to rotation. When the inner surface 316 of the friction element 314 is in a neutral position relative to the outer surface 250 of the sleeve 220, no additional frictional resistance is applied to the knob 300. This is similar when threads are disposed on both surfaces. As the inner surface 316 begins to contact the outer surface 250 (due to rotation of the screw 315 and corresponding engagement of the threads 319, 321), a greater force is applied thereto, and the resistance to rotation of the knob 300 increases. In order to balance the various forces, the components of the knob 300 are arranged so as to be substantially centered about the common axis $A_C$ that extends from the post 214. More specifically, the post 214 rotates about the common axis $A_C$, while the sleeve 220 is disposed about the post 214 and is fixedly secured to the knob mount 212 so as to not rotate about the axis $A_C$. The friction element 314 is disposed about the sleeve 220 and engaged therewith. The sun gear 324 is centered on the axis $A_C$ and the three screws 315 are arranged symmetrically about the axis $A_C$. In other examples, a greater or fewer number of screws 315 may be utilized.

Figure 4:
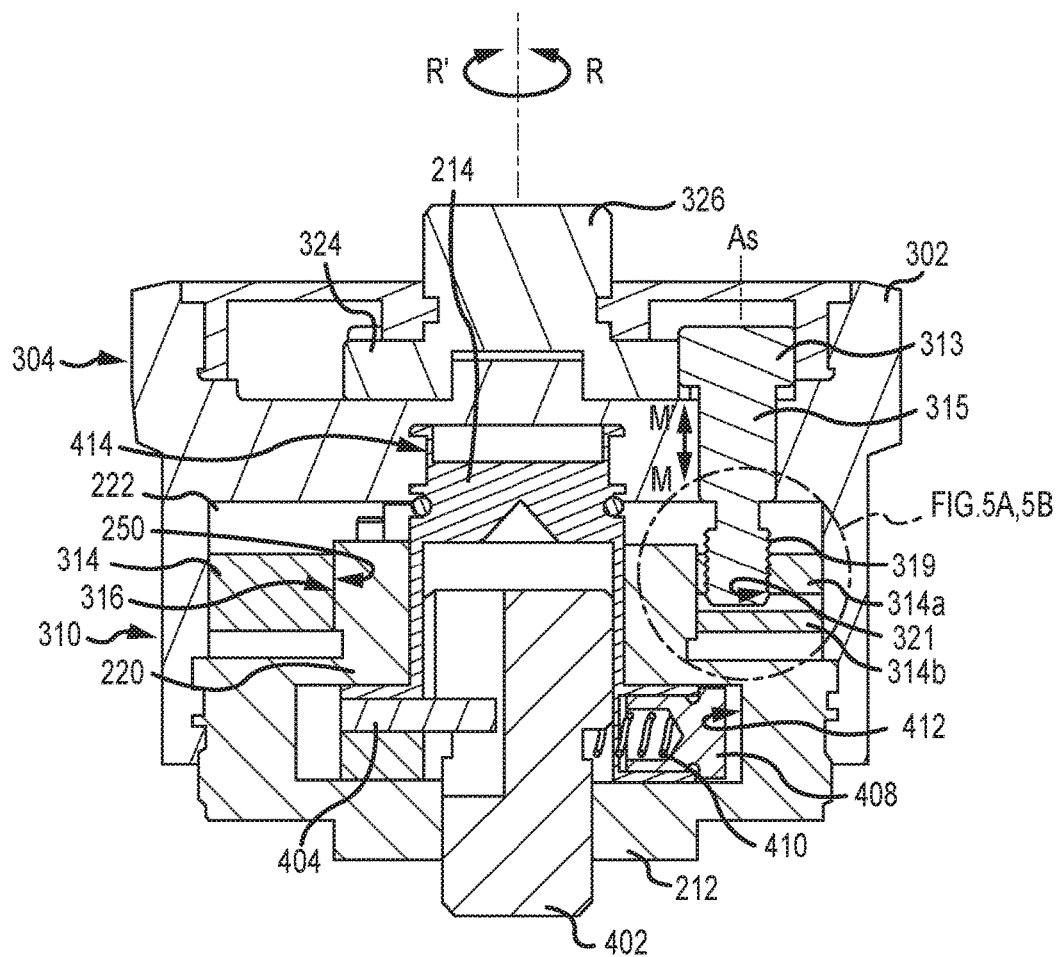
FIG. 4 depicts a sectional view of a variable friction knob for an optical device.

FIG. 4 depicts a sectional view of a variable friction knob 300, such as that depicted in FIGS. 3A and 3B. A number of the components depicted in FIG. 4 are described above in preceding figures, and are therefore not necessarily described further. The knob mount 212 is secured to the housing of an optical device (not shown) so as not to rotate. An extension element 402 penetrates the knob mount 212 and extends into the optical device housing. Movement thereof (either rotational or linear movement, as required or desired for a particular application), adjusts an optical setting of the optical device. In the depicted example, a set pin 404 extends from the post 214 into the extension 402, such that rotation of the post 214 is transferred to the extension 402, thus causing a corresponding rotation thereof. A clicker 408 is biased away from the axis $A_C$ by a spring 410 and into a detent surface 412. The clicker 408 and detent surface 412 aids in setting a position of the knob housing 302 such that the reference markings (not depicted) on the exterior surface 310 thereof align with the reference mark (not depicted) on the optical device housing.

The post 214 extends upwards from within sleeve 220 and is configured to rotate relative thereto, about the common axis $A_C$. The knob housing 302 is secured to the post 214 via a set screw (not depicted) inserted into the opening 306 so as to engage a neck 216 in the post 214. Multiple set screws may be utilized. As described above, the sleeve 220 has threads 250 that engage with mating threads 316 on the friction element 314. These threads 316, 250 are not depicted, for clarity. The adjustment element 326 is configured to be manually rotatable independent of knob housing 302 and the post 214, so as to enable adjustment of the frictional resistance to rotation of the knob housing 302. In FIG. 4, the friction element 314 is a partially split nut having a first portion 314a and a second portion 314b. The screws 315 penetrate the first portion 314a. When the adjustment element 326 is not in an actuated position, there is no additional frictional resistance applied to the knob housing 302 by the friction element 314 and the knob housing 302 is easiest to rotate. As the adjustment member 326 is rotated R about the axis $A_C$, the screws 315 rotate about axis $A_S$, the threads 319, 321 engage, and the screw 315 moves M downward until the screw 315 contacts the second portion 314b. Once contact is made, pressure applied by the screw 315 moves the first portion 314a upward and the second portion 314b downward, substantially along and parallel to the common axis $A_C$. As the threads 316, 250 engage between the friction element 314 and sleeve 220, this engagement increases the frictional resistance to rotation of the knob 302. Further rotation R of the adjustment element 324 increases the frictional resistance.

As described above, since friction between the threads 316, 250 increases and those elements do not utilize engaging parts such as detents, locking projections, and the like, sufficient rotational force may still overcome the set frictional resistance. As such, the knob 300 resists rotation that may occur inadvertently due to incidental contact (e.g., during movement of the rifle in the field), but will not be damaged if a significant rotational force is applied to the knob housing 302. When a shooter wishes to reduce the frictional resistance, the adjustment element 326 is rotated R' in an opposite direction so as to move M' the screw 315 upward, reducing frictional contact between the threads 316, 250.

Figure 5A:
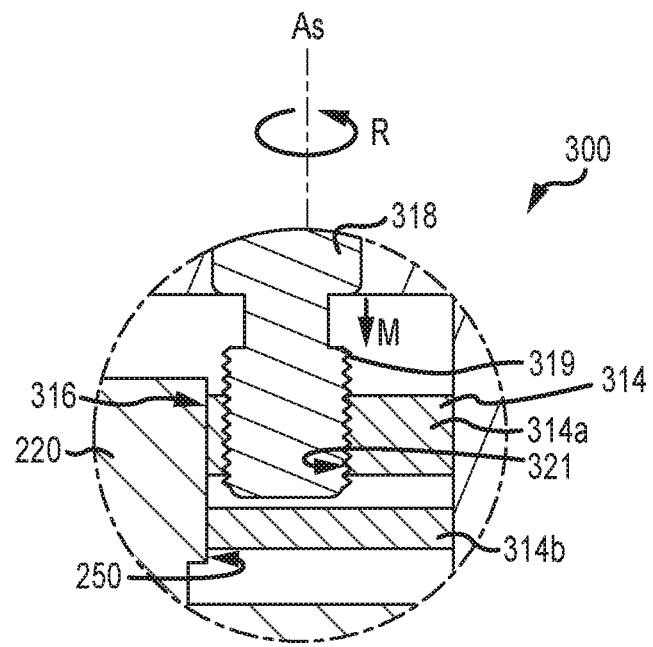
FIGS. 5A-5B depict enlarged partial section views of the variable friction knob of FIG. 4.
Figure 5B:
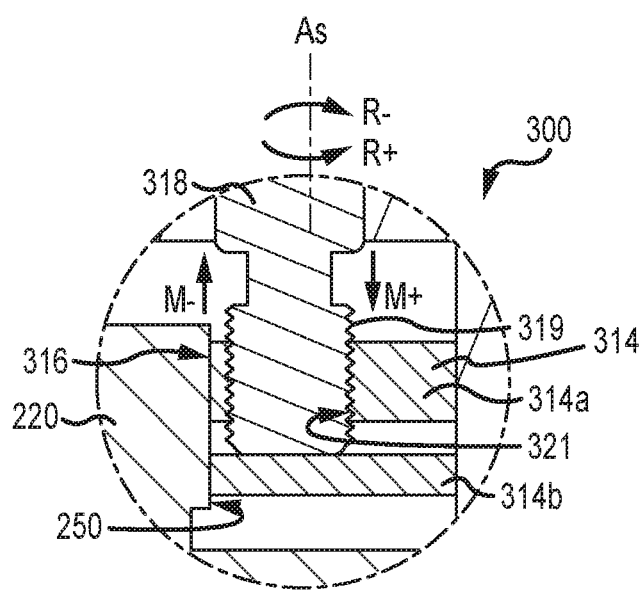

FIGS. 5A-5B depict enlarged partial section views of the variable friction knob 300 of FIG. 4. A number of the components depicted in FIGS. 5A and 5B are described above in preceding figures, and are therefore not necessarily described further. FIG. 5A depicts the friction element 314 in a position so as to exert no additional frictional resistance. Thus, the knob 300 is free to rotate about the common axis (not shown). Rotation of the adjustment element (not shown) rotates R the screw 315 about screw $A_S$, thus moving M the screw downward. Once the screw 315 contacts the second portion 314b of the friction element 314, the frictional resistance between the friction element 314 and sleeve 220 increases, due to increased friction between the surfaces 316, 250. The friction between the surfaces 316, 250 increases because the first portion 314a and the second portion 314b are being pushed away from each other by the screw 315. A friction increase between the surfaces 316, 250 causes a corresponding increase in resistance to rotation of the knob housing 302. The adjustment element may be further rotated, thus causing a greater rotation R+ of the screw 315, resulting in movement M+ thereof and, as a result, greater friction between the threads 316, 250. This increases frictional resistance of the knob housing 302 to rotation. Rotation of the adjustment element in an opposite direction causes an opposite rotation R− of the screw 315, and opposite directional movement M− thereof. Further opposite rotation R− of the adjustment screws 315 returns the screw 315 to the condition depicted in FIG. 5A, where the screw 315 is entirely disengaged from the second portion 314b.

Figure 6:
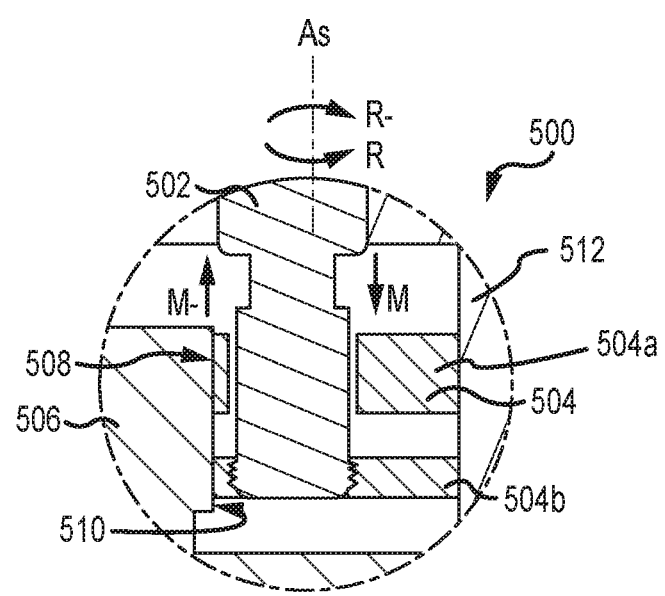
FIG. 6 depicts an enlarged partial section views of another example of a variable friction knob for an optical device.

FIG. 6 depicts an enlarged partial section views of another example of a variable friction knob 500 for an optical device. Rotation of the adjustment element (not shown) rotates R the screw 502 about screw $A_S$, thus moving M the screw 502 downward. In this example, however, the screw 502 passes through a first portion 504a of a friction element 504 and is instead threadably engaged with a second portion 504b thereof. As the screw 502 rotates, the second portion 504b is draw towards the first portion 504a and the frictional resistance between the friction element 504 and sleeve 506 increases, due to increased friction between the surfaces 508, 510. A friction increase between the surfaces 508, 510 causes a corresponding increase in resistance to rotation of the knob housing 512. The adjustment element may be further rotated, thus causing a greater rotation of the screw 502, resulting in movement thereof and, as a result, greater friction between the surfaces 508, 510. Rotation of the adjustment element in an opposite direction causes an opposite rotation R− of the screw 502, and opposite directional movement M− thereof.

The materials utilized in the manufacture of the variable friction knobs depicted therein are similar to those typically used in manufacture of knobs for optical devices. For example, the knob housings and other components may be aluminum or other robust metals and may be powder coated or otherwise treated to resist corrosion. The adjustment element may be low-friction material such as PVC, ABS, nylon, or other plastics. Additionally, metals may be used and may be coated with Teflon or other low-friction coatings at the interface between the adjustment element and friction element to ensure smooth movement of the interface therebetween. The friction element may include higher friction materials such as sintered metal, uncoated aluminum, or other similar metals to promote molecular bonding between parts.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An apparatus comprising:
    an optical device housing;
    a post rotatably extending from the optical device housing;
    a sleeve fixedly extending from the optical device housing and disposed about the post;
    a knob connected to the post so as to be rotatable relative to the optical device housing;
    a nut rotatably engaged with the sleeve and configured to rotate with the knob; and
    an adjustment screw comprising a screw axis, wherein the adjustment screw is threadably engaged with the nut and engaged with the knob so as to rotate with the knob, wherein a rotation of the adjustment screw about the screw axis increases a frictional resistance between the nut and the sleeve.

2. The apparatus of claim 1, wherein the post comprises a post axis and wherein each of the post, the sleeve, the knob, and the nut are centered about the post axis, and wherein the post axis is substantially parallel to the adjustment axis.

3. The apparatus of claim 2, wherein the nut defines an opening for threadably receiving the adjustment screw.

4. The apparatus of claim 3, wherein the rotation of the adjustment screw about the screw axis moves the adjustment screw along the adjustment screw axis and within the opening.

5. The apparatus of claim 3, wherein the nut comprises a split nut.

6. The apparatus of claim 5, wherein the split nut comprises a first portion and a second portion, wherein each of the first portion and the second portion are threadably engaged with the sleeve, and wherein the first portion defines the opening.

7. The apparatus of claim 6, wherein the rotation of the adjustment screw about the screw axis moves the adjustment screw along the adjustment screw axis and into contact with the second portion.

8. The apparatus of claim 1, wherein the nut is threadably engaged with the sleeve.

9. An apparatus comprising:
    an optical device housing;
    a post rotatably extending from the optical device housing;
    a sleeve fixedly extending from the optical device housing and disposed about the post, wherein the post and sleeve are centered on a common axis;
    a knob connected to the post so as to be rotatable relative to the optical device housing;
    a nut engaged with the sleeve and configured to rotate with the knob; and
    an adjustment screw comprising a screw axis substantially parallel to the common axis, wherein the adjustment screw is configured to engage the nut along the screw axis, wherein a rotation in a first direction of the adjustment screw about the screw axis applies a force to the nut so as to increase a frictional resistance between mating threads on the nut and the sleeve.

10. The apparatus of claim 9, wherein each of the nut and the sleeve comprising mating threads and wherein a rotation in a second direction of the position adjustment element decreases the frictional resistance between the mating threads on the nut and the sleeve.

11. The apparatus of claim 10, wherein the rotation in the second direction entirely disengages the adjustment screw from at least a portion of the nut.

12. The apparatus of claim 9, wherein the adjustment screw is threadably engaged with and received in the nut.

13. The apparatus of claim 9, wherein the nut is disposed around the sleeve.

14. The apparatus of claim 13, wherein the nut is a split nut.

15. The apparatus of claim 9, wherein the adjustment screw is actuated from a top portion of the knob.

16. The apparatus of claim 15, wherein the adjustment screw is actuated by manually rotating a gear.

17. An apparatus comprising:
   an optical device housing;
   a post rotatable about an axis extending from the optical device housing;
   a sleeve fixedly extending from the optical device housing and disposed about the post, wherein the post and sleeve are centered on an axis;
   a knob connected to the post so as to be rotatable relative to the optical device housing;
   a split nut rotatably engaged with the sleeve, the split nut comprising a first portion and a second portion; and
   an adjustment screw engaged with the split nut, wherein a rotation of the adjustment screw moves the split nut in at least one direction parallel to the axis, while not rotating the split nut.

18. The apparatus of claim 17, wherein in a first adjustment screw position, the adjustment screw is threadably received in the first portion and disengaged from the second portion.

19. The apparatus of claim 18, wherein in a second adjustment screw position, the adjustment screw is threadably received in the first portion and is engaged with the second portion so as to generate a first frictional resistance between mating threads of the split nut and the sleeve.

20. The apparatus of claim 19, wherein in a third adjustment screw position, the adjustment screw is threadably received in the first portion and is engaged with the second portion so as to generate a second frictional resistance between mating threads of the split nut and the sleeve, wherein the second frictional resistance is greater than the first frictional resistance.

* * * * *